United States Patent [19]

Shimada et al.

[11] Patent Number: 5,145,255
[45] Date of Patent: Sep. 8, 1992

[54] STIRRING APPARATUS AND STIRRING TOWER TYPE APPARATUS FOR POLMERIZATION REACTIONS

[75] Inventors: Takafumi Shimada; Hiroaki Ogasawara; Hidetaro Mori; Setsuo Omoto; Kazuto Kobayashi, all of Kanonshin; Takao Yamazaki, Yokohama, all of Japan

[73] Assignee: Mitsubishi Jukogoyo Kabushiki Kaisha, Tokyo, Japan

[21] Appl. No.: 627,880

[22] Filed: Dec. 13, 1990

Related U.S. Application Data

[63] Continuation of Ser. No. 195,767, May 18, 1988, abandoned.

[30] Foreign Application Priority Data

May 19, 1987 [JP] Japan ................................ 62-120084
May 27, 1987 [JP] Japan ................................ 62-128460

[51] Int. Cl.$^5$ .............................................. B01F 7/02
[52] U.S. Cl. .................................... 366/329; 366/325; 366/295; 366/328; 422/135; 422/137; 422/193; 422/229
[58] Field of Search ............... 422/135, 134, 137, 193, 422/195, 225, 229, 236; 366/325, 329, 295, 307, 328

[56] References Cited

U.S. PATENT DOCUMENTS

| | | | |
|---|---|---|---|
| 963,122 | 7/1910 | Damon | 366/319 |
| 1,764,510 | 6/1930 | Goodfellow | 366/319 |
| 2,626,856 | 1/1953 | Alles | 422/229 |
| 2,893,846 | 7/1959 | Wistrich et al. | 366/307 |
| 2,912,310 | 11/1959 | Walle et al. | 366/307 |
| 3,164,444 | 1/1965 | Anderson | 422/229 |
| 3,709,664 | 1/1973 | Krekeler et al. | 366/307 |
| 3,752,653 | 8/1973 | Weber | 422/195 |
| 3,927,983 | 12/1975 | Gordon et al. | 422/135 |
| 3,934,860 | 1/1976 | Michels et al. | 259/108 |
| 3,987,021 | 10/1976 | Rothert | 422/135 |
| 4,289,733 | 9/1981 | Saito et al. | 422/227 |
| 4,329,069 | 5/1982 | Graham | 366/329 |
| 4,438,074 | -3/1984 | Wilt | 422/225 |
| 4,442,273 | 4/1984 | Neiditch et al. | 422/135 |
| 4,450,141 | 5/1984 | Linde | 422/225 |
| 4,460,278 | 7/1984 | Matsubara et al. | 366/149 |
| 4,793,713 | 12/1988 | King | 366/325 |
| 4,855,113 | 8/1989 | Yen | 422/195 |

FOREIGN PATENT DOCUMENTS

| 1578 | 1/1973 | Japan | 422/134 |
| 472907 | 5/1969 | Switzerland . | |

OTHER PUBLICATIONS

Weber, A. P.; "Selecting Turbine Agitators"; Chemical Engineering, Dec. 7, 1964, pp. 169–174.

Primary Examiner—Robert J. Warden
Assistant Examiner—Laura E. Collins
Attorney, Agent, or Firm—McGlew & Tuttle

[57] ABSTRACT

In order to improve mixing efficiency of highly viscous fluid, while structural simplicity being maintained, two types of stirring impellers are employed in a single stirring apparatus. One of such stirring impellers is a large flat impeller and the other is a slanted or screw-shaped impeller to cause an up-and-down flow. This principle is further utilized in a stirring tower type polymerization reaction apparatus which has an array of mixing areas, each of which corresponds to the stirring apparatus above, and partitions between the mixing areas. The partitions are disposed so that the temperature of reaction can be controlled easily. Undesirable effects such as "dead space", space in which flow is insufficient, and the attachment of gelled material to the rotational shaft can be avoided while rather obvious, but no less important, advantages of efficient and uniform mixing, etc., are secured.

7 Claims, 8 Drawing Sheets

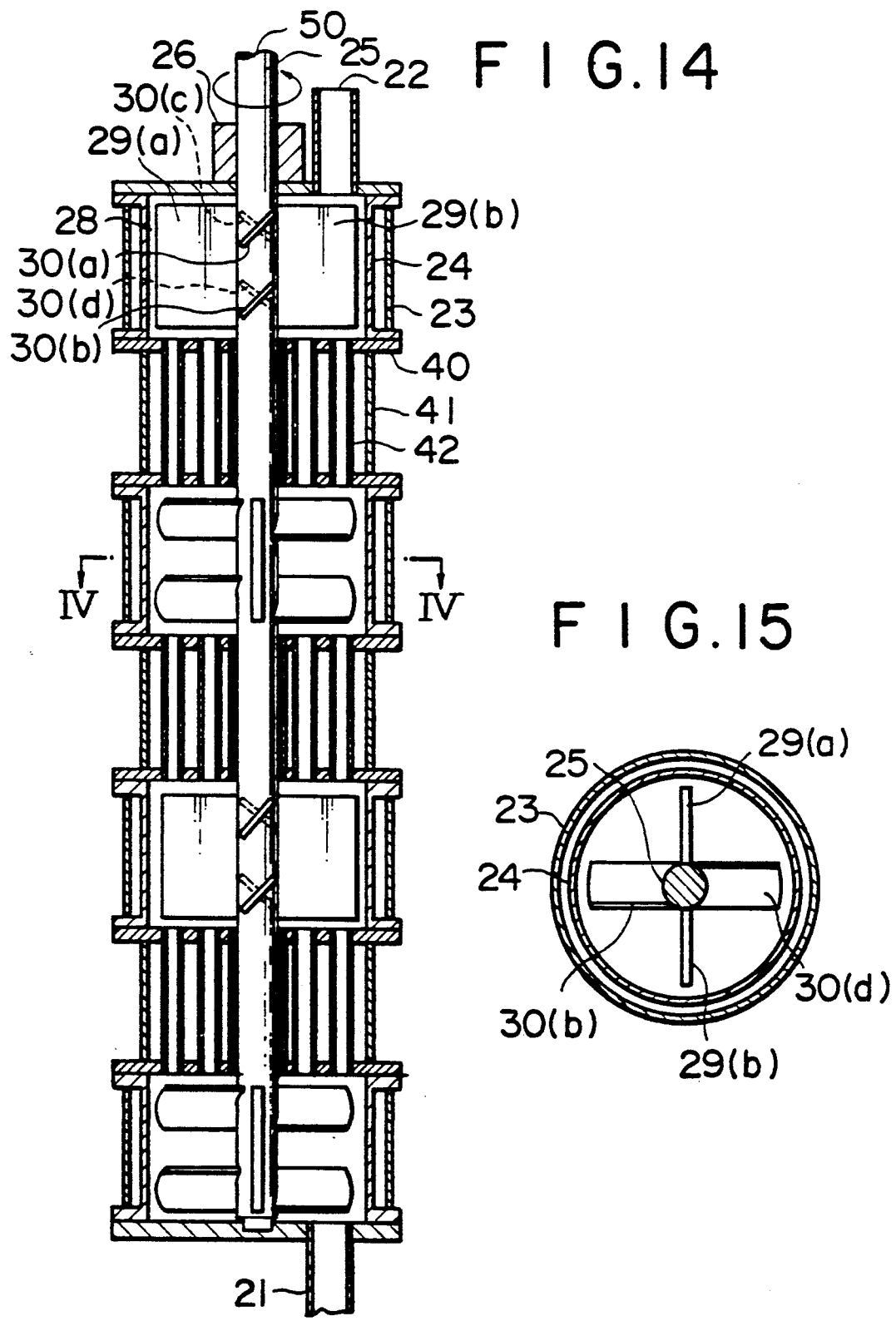

STIRRING APPARATUS AND STIRRING TOWER TYPE APPARATUS FOR POLMERIZATION REACTIONS

This is a file wrapper continuation application of application Ser. No. 195,767, filed May 18, 1988, now abandoned.

FIELD OF THE INVENTION AND RELATED ART STATEMENT

The present invention relates primarily to a stirring apparatus and more particularly to a stirring apparatus which is used as a reaction apparatus in which reactions of highly viscous materials, for example viscous liquids or slurries, take place, with the intention of obtaining uniform products by stirring in a mixing container or under mixing conditions.

The present invention also relates to a high performance apparatus for polymerization reactions in manufacturing high molecular compounds continuously.

More specifically, the present invention relates to an apparatus for continuous polymerization reactions which is used particularly for solution polymerization and bulk polymerization in a highly viscous and homogeneous system.

As stirring apparatuses for highly viscous materials, large paddle impellers, anchor type impellers, helical ribbon impellers, and helical screw impellers have been often used as discussed in *Mixing Principles and Applications* by Shinji Nagata (Kodansha, 1976).

Large paddle impellers and anchor type impellers are structurally simple and easy to clean and manufacture. However, they are not effective in stirring highly viscous materials. Particularly, when the stirring Reynolds number, Re ($=\rho n d^2/\mu$, where $\rho$ is the density, n the number of rotations per unit time, d the radius of the impeller, $\mu$ the viscosity), is less than or equal to the order of ten, they show significantly inferior vertical stirring performances.

Helical ribbon impellers and helical screw impellers with draft tubes, on the other hand, work well, to five at better mixing effect, with highly viscous materials and show a sufficiently good performance even at low Reynolds numbers. Since they have a very complicated structure, however, they are difficult and expensive to manufacture, and cleaning them is troublesome.

Also, as polymerization reactions for manufacturing high molecular compounds, solution and bulk polymerization methods have been widely used. In these solution and bulk polymerization methods, when polymers dissolve in monomers and solvent, the system becomes homogeneous and highly viscous as polymerization reactions progress.

As examples for such polymerization reactions, the following can be cited: bulk polymerization of acrylonitrile-styrene resin, solution polymerization of acrylonitrile-butadiene-styrene resin, solution polymerization of polybutadiene, solution polymerization of styrene-butadiene rubber, condensation polymerization (particularly in its final stage) of nylon 6 in which ε-caprolactam is used as an ingredient, condensation polymerization (particularly in its intermediate stage) of nylon 66 in which adipic acid and hezamethylenediamine are used as ingredients. Solution polymerization of polyvinyl acetate, etc.

General requirements for a continuous polymerization reactor for highly viscous reaction fluids are discussed in detail in *Jugohannosochi No Kiso To Kaiseki* (*Basics and Analysis of Polymerization Reaction Apparatus in Japanese*) by Yasuhiro MURAKAMI, publisher Baifuukan, 1976. From this reference the following list of requirements may be extracted.

(1) Residence time distribution is sharp; i.e., the piston flow characteristics are required.

(2) Missing efficiency is high so that the temperature and concentration distribution in every part in the flow direction is uniform.

(3) There is no "dead space," space in which flow is obstructed, anywhere in the reaction apparatus.

(4) Power required for powering the impellers is small.

(5) Heat transferring areas and heat transfer coefficients are large so that heat of reaction can be removed quickly.

(6) The structure of the apparatus is simple and easy to clean.

Efforts have been made to satisfy theses requirements as much as possible, and there have been proposed numerous polymerization apparatuses. However, no single apparatus has been truly satisfactory.

An example of previously proposed continuous polymerization apparatuses is the model apparatus of Japanese Patent Application No. 127489/1979, which suffers such disadvantages as a large power requirement for powering the impellers, small heat transferring areas and a complicated structure. Also, Japanese Patent Provisional Publication 99290/1978 discloses a reaction apparatus with problems relating to the piston flow characteristics. Furthermore, the reaction apparatus disclosed in Japanese Patent Provisional Publication 202720/1985 has a complicated structure because of its two rotational shafts. Like these examples, the previously proposed continuous type polymerization apparatuses have various problems.

OBJECTS AND SUMMARY OF THE INVENTION

It is an object of the present invention to solve the above problems of the conventional stirring apparatus and provide a new stirring apparatus having a simple structure whose mixing performance for highly viscous materials is high.

It is another object of the present invention to provide an stirring tower type apparatus for polymerization reactions which has a sharp residence time distribution (i.e., the piston flow characteristics), high mixing efficiency in every stirring area along the flow, higher heat transfer coefficients, a simple structure, no obstructed flow areas and which has a small power requirement for powering impellers, in order to solve the problems in polymerization reactions discussed above.

The present invention provides a stirring apparatus comprising a container, a rotational shaft inserted into the container, and a flat impeller whose area is more than 60% of the sectional area encircled by the center of the rotational shaft, an inner wall of the container and the surface of materials being stirred in the container. This flat impeller is fixed in a sufficiently parallel fashion to the rotational shaft.

By rotating the above large flat impeller and a slanted impeller attached to the rotational shaft at a certain angle from the center axis of the rotational shaft in the container, a stirring apparatus of the present invention is capable of:

(1) Producing, with the large impeller, two types of flow, a slow outer flow and a fast inner circulation;

(2) Producing, with the slanted impeller an additional flow, imposed on either one or both of the two types of flow, the additional flow being vertical;

(3) With the effects of (1) and (2) above, introducing better circulation covering every part of the container, and thus making fast and efficient mixing possible.

Utilizing the principle of the above stirring apparatus, the present invention also provides a stirring tower type apparatus for polymerization reactions that comprises a cylindrical container having a fluid supply inlet and a fluid outlet; a rotational shaft coaxially inserted into the container; stirring means comprising a plurality of flat impellers attached to the rotational shaft with their face being substantially parallel to the canter axis of the rotational shaft, and slanted impellers attached to the above rotational shaft at a certain angle from the center axis forming sets with the flat impellers; and partitioning means to divide the above container in the longitudinal direction between the above stirring means.

In the reaction apparatus of the above structure, fluid is supplied into the container from the fluid supply inlet and introduced into stirring areas divided by the partitioning means in the longitudinal direction. In these stirring areas, as in the stirring apparatus above, the flat impellers and slanted impellers which serve as stirring means and which are attached to the rotational shaft are rotated to create circulating flows such as up, down and horizontal flows with the combined effects of the two types of impellers above. The supplied fluid is stirred and mixed sufficiently, sent from one stirring area to another to be stirred and mixed further and finally discharged from the fluid outlet of the container out of the system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

These and other objects as well as advantage of the present invention will become clear by the following description of preferred embodiments of the present invention with reference to the accompanying drawings:

FIG. 14 is a vertical section of another embodiment of the reaction apparatus of the present invention;

FIG. 15 is a horizontal section along the IV—IV line in FIG. 14;

DETAILED DESCRIPTION OF PREFERRED EMBODIMENTS

Several embodiments of the stirring apparatus of the present invention will be first explained in the following with reference to FIGS. 1 to 11. Next, three embodiments of the apparatus for polymerization reactions of the present invention will be described with reference to the FIGS. 12 to 18.

Figure 1:
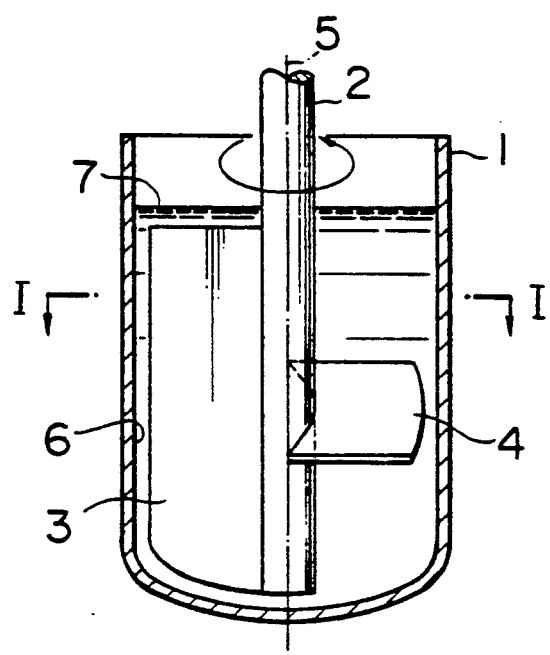
FIG. 1 is a vertical section of a first embodiment of the present invention.
Figure 2:
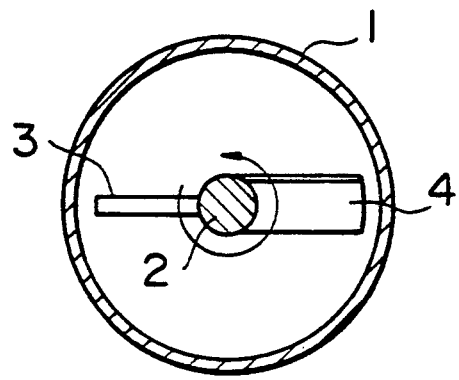
FIG. 2 is a section of FIG. 1 along the I—I line.

FIGS. 1 and 2 show an embodiment of the stirring apparatus of the present invention. A rotational shaft 2 is inserted in a container 1, and a flat impeller 3 and a slanted impeller 4 are fixed to the rotational shaft. The flat impeller 3 is disposed substantially parallel to the center axis 5 of the rotational shaft 2. The area of the flat impeller is more than 60% of the sectional area encircled by the center axis 5 of the shaft, the inner wall of the container 6 and the fluid surface 7. If this area is less than 60% a high stirring performance that will be discussed below can not be attained. Also, the slanted impeller 4 is fixed to the rotational shaft 2 with a certain angle against the center axis.

Figure 3:
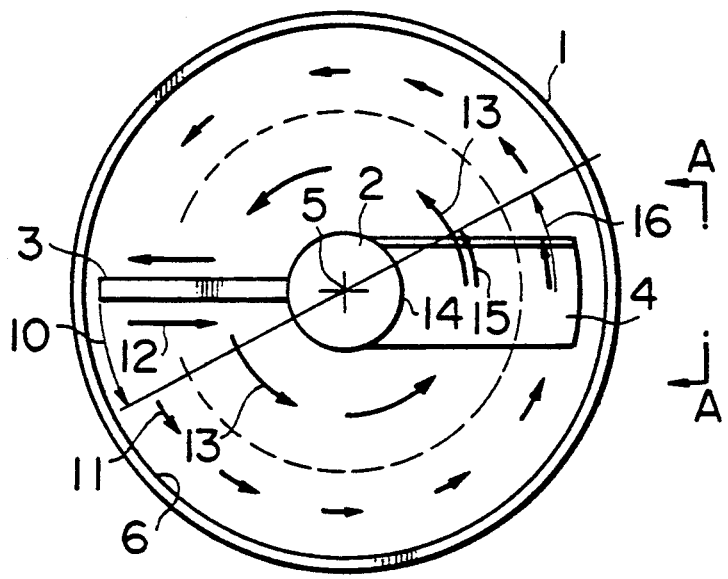
FIG. 3 is a schematic view of a flow pattern of the above embodiment.

FIG. 3 shows a flow pattern along the horizontal section of the container (the section indicated by II—II in FIG. 1) while stirring highly viscous materials using the impeller of FIGS. 1 and 2. When the flat impeller 3 is moving at a speed (indicated by Arrow 10), the outer portion of the fluid is pushed by the flat impeller 3 and moves in the same direction. With the effect of the viscous resistance between the impeller and the wall 6, however, the velocity (indicated by Arrow 11) of the fluid near the circumference is less than the speed 10 of the flat impeller 3.

As a result, the displaced volume of the fluid due to this movement of the impeller 3 becomes different from that of the fluid near the circumference, and this difference causes a flow in the radial direction, appearing as a flow velocity (indicated by Arrow 12) in the radial direction near the flat impeller 3. This radial flow toward the center changes its direction as it reaches the center and becomes an inner circulating flow with an inner flow velocity (indicated by Arrow 13).

The inner circulating flow thus generated is strong, and the inner flow velocity 13 becomes much greater than the velocity (indicated by Arrow 14) of the surface of the rotational shaft 2 and the velocity of the slanted impeller 4 at its inner portion.

On the other hand, the velocity of the fluid near the circumference 11 is much smaller than the velocity (indicated by Arrow 16) of the slanted impeller 4 at its outer portion.

Figure 4:
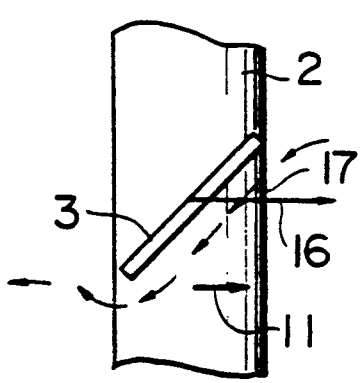
FIGS. 4 and 5 are flow patterns near the circumference and in the inner part of the container, respectively, observed from the A—A plane of FIG. 3.

FIG. 4 shows a flow pattern near the circumference observed from the A—A plane in the pointed direction. Because the velocity 11 of the fluid near the circumference is small compared to the velocity (indicated by Arrow 16) of the slanted impeller 4, the fluid moves downward as indicated by arrow 17.

Figure 5:
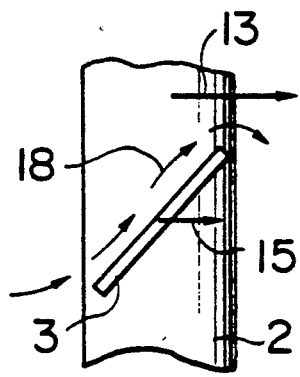

FIG. 5 shows a flow pattern of the inner part observed from the A—A plane. In this part of the apparatus of the present invention, quite contrary to the situation near the circumference shown in FIG. 4, the inner flow velocity 13 becomes large compared to the velocity (indicated by Arrow 15) of the slanted impeller 4, and the fluid moves upward as indicated by arrow 18.

Since the large flat impeller 3 is intended to generate the two types of flow as described above, certain restrictions on its size have to be observed. In FIG. 3, a positive pressure is generated at the front of the flat impeller 3 because the fluid is being displaced by the moving flat impeller 3: a negative pressure is generated at the rear as the space created by the motion of the flat impeller is being filled up by the inner circulating flow of the fluid. Because of this pressure difference, a shortcut flow is generated in the space between the tip of the flat impeller 3 and the inner wall 6 of the container.

Because the inner circulating flow decreases as the shortcut flow increases, this shortcut flow has to be minimized. From the various experimental results obtained by the inventors of the present invention it has been found that the area encircled by the center axis 5 of the rotational shaft and the outer edge of the flat impeller 3 needs to be more than 60%, preferably more than 80%, of the area enclosed by the center axis 5, the fluid surface, and the wall 6 of the container.

Also, the angle at which the slanted impeller is attached can be selected rather freely. While in FIGS. 1 to 3 an up flow near the circumference and a down flow in the inner part are shown to be generated, reversed flows can be created if the above angle is flipped.

While an embodiment of the present invention has been described in terms of its structure, functions and effects, the present invention is by no means restricted to the above stirring apparatus and naturally includes the examples discussed below.

Figure 6:
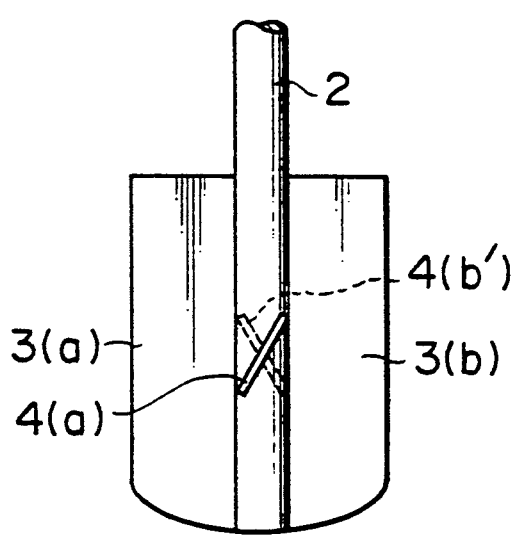
FIG. 6 is an elevational view of a second embodiment of the present invention.
Figure 7:
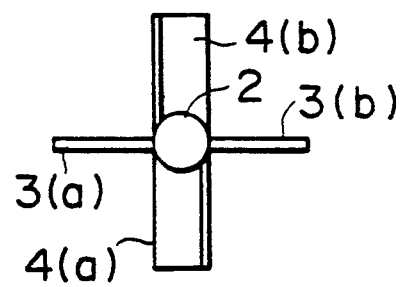
FIG. 7 is a plan view of the above second embodiment.

FIG. 6 is an elevational view of a second embodiment of the present invention. FIG. 7 is a plan view of the stirring apparatus shown in FIG. 6 having two flat impellers 3(a), 3(b) and two slanted impellers 4(a), 4(b), and shows that the stirring apparatus of the present invention is not restricted by the number of the flat and slanted impellers.

Figure 8:
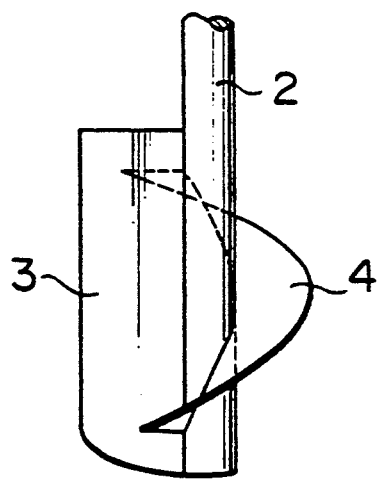
FIG. 8 is an elevational view of a third embodiment of the present invention.
Figure 9:
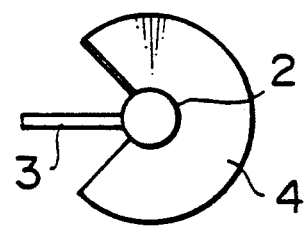
FIG. 9 is a plan view of the above third embodiment.

FIG. 8 is an elevational view of a third embodiment of the present invention. FIG. 9 is a plan view of the stirring apparatus shown in FIG. 8 having one flat impeller 3 and a screw type slanted impeller 4, and shows that the stirring apparatus of the present invention is not restricted to flat slanted impellers.

Figure 10:
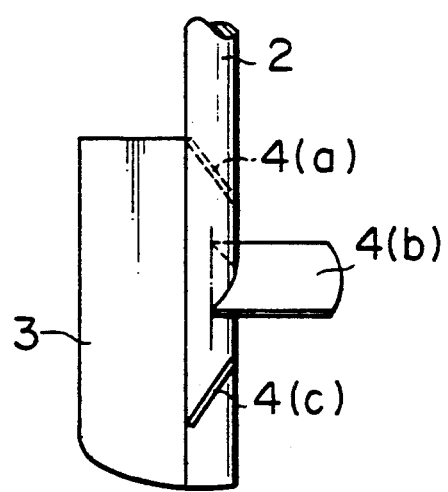
FIG. 10 is an elevational view of a fourth embodiment of the present invention.
Figure 11:
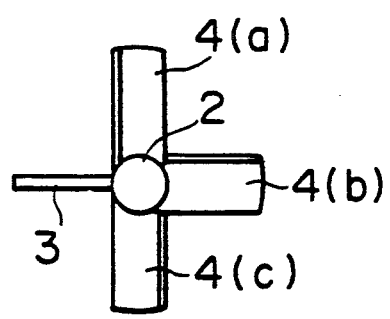
FIG. 11 is a plan view of the above fourth embodiment.

FIG. 10 is an elevated view of a fourth embodiment of the present invention. FIG. 11 is a plan view of the stirring apparatus of the present invention having one slanted impeller 3 and three slanted impellers 4(a), 4(b), 4(c) attached at different angles from the flat impeller, and shows that the stirring apparatus of the present invention is not restricted by the number of the slanted impellers and their direction of attachment.

In the second or the third embodiment above, the flat impellers and slanted impellers are capable of achieving similar effects and results as explained for the first embodiment and generate flows in every part of the container to attain fast and efficient stirring.

Further, while in any of the above embodiments, the slanted impellers are disposed in the slow flow near the circumference and the fast inner circulating flow in the inner part, the slanted impellers can be made to generate a vertical flow only in one of the above two types of flow.

The following are experimental results to show some effects of the stirring apparatus of the present invention in comparison to the conventional stirring apparatus.

COMPARATIVE EXAMPLE A1

Inside a transparent container of acrylic resin whose inner diameter and height are both 200 mm, an anchor type impeller whose diameter is 190 mm was disposed. Each of $I_2$ and $Na_2S_2O_3$ was dissolved into a starch syrup solution which has the viscosity of 200 poise to make two different solutions. The two solutions were supplied to the container separately, and the impeller was rotated at n=15 (rpm). Subsequently, the time necessary for the dark brown color of $I_2$ to vanish due to the effect of $Na_2S_2O_3$, t(min), was measured, and the required number of rotation N=n·t was calculated.

As a result, it was found that even with values of N over 200 the color of $I_2$ remained in the upper and center parts of the container.

COMPARATIVE EXAMPLE A2

In the same container as used in Comparative Example A1, a helical ribbon impeller whose diameter is 190 mm was disposed and N=n·t was obtained by measuring t(min) in the same manner as the above.

As a result, it was found that at N=35 the $I_2$ color disappeared everywhere except for the vicinity of the rotational shaft, and at N=60 the color disappeared from the entire container.

EXPERIMENTAL EXAMPLES A1 TO A4

In the same container as used in Comparative Example A1, each of four sets of new impellers of the present invention whose corresponding diameter of a flat impeller is 190 mm was disposed, and N=n·t was obtained by measuring the time t(min) for the disappearance of the $I_2$ color in the entire container in the same manner as in Comparative Example A1.

The results are shown in TABLE 1 below.

TABLE 1

| Exp. Example | Impeller shapes used | N = n · t |
|---|---|---|
| 1 | FIGS. 1 and 2 | 55 |
| 2 | FIGS. 6 and 7 | 45 |
| 3 | FIGS. 8 and 9 | 42 |
| 4 | FIGS. 10 and 11 | 30 |

From TABLE 1 it is clear that the stirring apparatus of the present invention is superior, despite its simple structure, even to the helical ribbon impeller, which is said to mix highly viscous fluids in the shortest time.

The present invention comprises a large flat impeller whose area is more than 60% of the sectional area encircled by the center axis of a rotational shaft, the inner wall of a container and the surface of supplied fluid, and this large flat impeller is attached to the rotational shaft in a substantially parallel fashion. Therefore, a slow flow near the circumference of the container and a fast inner circulating flow inside are generated because of rotation of this flat impeller. Also, a slanted impeller attached to the rotational shaft at a certain angle from the center axis is disposed and rotated in either one of the above two flows or in both of them to generate a vertical flow in order to ensure the complete flow of fluid in every part of the container and efficient stirring.

Consequently, the present invention achieves a fast and efficient stirring performance in treating highly viscous liquids or slurry by quickly forming a complete flow pattern covering the entire container.

In the following, embodiments of the stirring tower type apparatus for polymerization reactions of the present application are explained in detail with reference to FIGS. 12 to 18.

Figure 12:
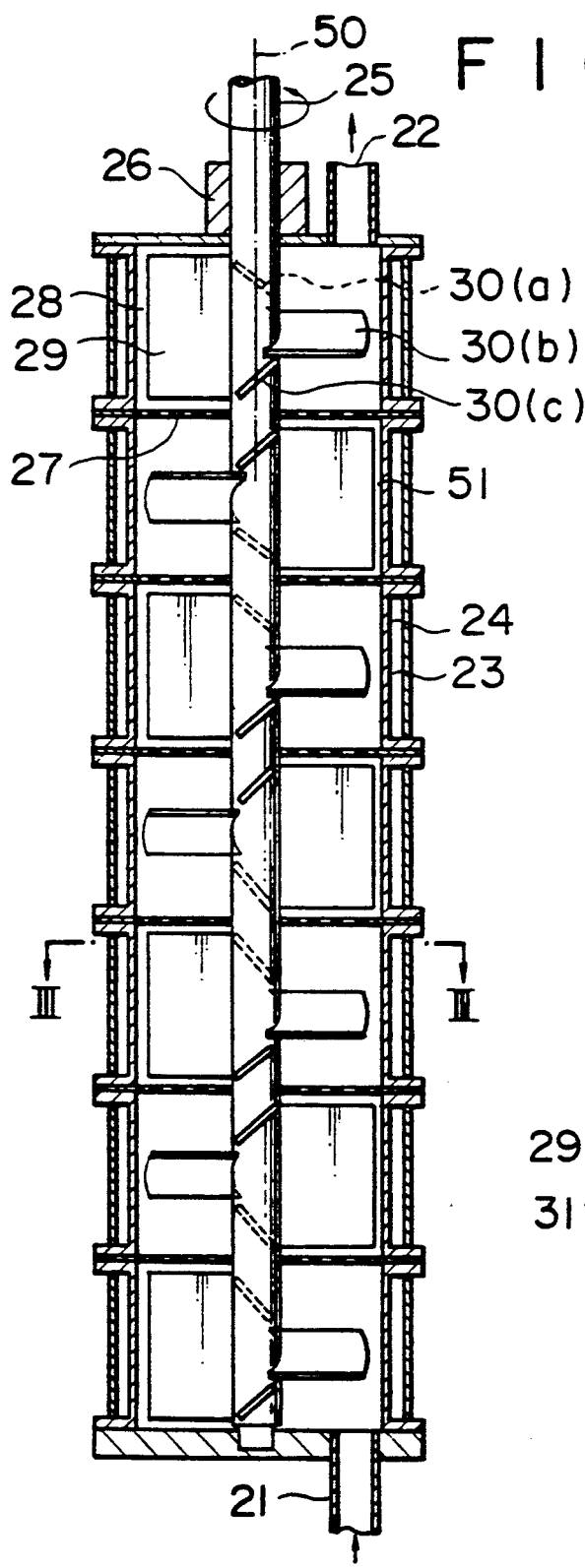
FIG. 12 is a vertical section of an embodiment of the reaction apparatus of the present invention.

FIG. 12 is a vertical section of an embodiment of the reaction apparatus of the present invention.

Figure 13:
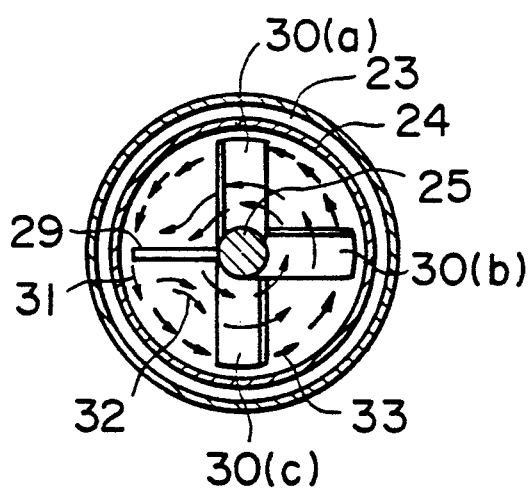
FIG. 13 is a horizontal section along the II—II line in FIG. 12.

In FIGS. 12 and 13, a rotational shaft 25 is inserted into a container 24 having a fluid supply inlet 21, a fluid outlet 22 and a jacket 23. This rotational shaft is sealed rotatably by a shaft sealing means 26. The container 24 is divided by a number of baffle plates 27 serving as partitioning means, and the piston flow characteristics are secured in the direction of flow. Perforated plated with a certain opening ratio are used as baffle plates. In stirring chambers 28 partitioned by the obstructing plated, stirring means are attached to the rotational shaft 25. The stirring means in each of the stirring chambers comprise the center axis 50 of the rotational shaft 25, a flat impeller parallel to it, and slanted impellers 30(a), 30(b), 30(c) which form a set with one of the flat impellers above. These three slanted impellers, whose shape is close to a rectangular plate, are attached to the rotational shaft 25 at 90° apart from the flat impeller and other slanted impellers with their vertical position on the shaft shifted from each other, and their slanting angle and direction are the same with respect to the center axis 50 as shown in the figure.

FIG. 13 is a horizontal section along the II—II line in FIG. 12. As the rotational shaft rotates, the flat impeller 29 moves in the direction of Arrrow 31, and the fluid displaced by this motion forms a large circulation flow in the inner part as indicated by Arrow 32. Since the velocity of this circulating flow is greater than that of the slanted impellers 30(a), 30(b), 30 (c), the flow takes over the impellers in effect, and the fluid in the circulating flow is pushed up by the slanted impellers 30 and moves upward. On the other hand, since the fluid near the container wall is under the influence of viscous resistance from the wall and moves slowly in the direction along the wall as indicated by Arrow 33 in FIG. 13, it is pushed down by the slanted impellers 30 and moves downward. Thus, an up flow in the center part and a down flow near the wall are generated to form an overall vertical circulating flow. Also, if the slanted impellers are tilted in the opposite direction of the impellers shown in the figures, a down flow in the center part and an up flow near the wall are generated.

As described above, circulating flows in both of the horizontal and vertical directions are generated at the same time in the stirring chamber 28, and thus efficient mixing can be achieved.

Also, since the stirring effect of the flat impeller reaches even to the corners of the container, there is no room for "dead space."

In the case of normal stirring impellers, flow near the rotational shaft tends to be insufficient, and gelled material or the like attaches to the shaft. In the reaction apparatus of this embodiment of the present invention, however, a strong circulation flow is formed around the rotational shaft 25, and the attachment of gelled material is prevented.

As described above, since the large flat impeller 29 plays the role of generating a horizontal circulating flow, its size is subject to certain restrictions. In FIG. 13, in the front of the flat impeller 29 in the direction of rotation, a positive pressure is generated because of the displacement of fluid: in the rear, a negative pressure results as the space created by the motion of the impeller is being filled up by circulating flow. Thus, a pressure difference appears between the front and rear of the flat impeller, and a shortcut flow occurs in the gap between the inner wall 51 of the container and the tip of the flat impeller 29. Because as this shortcut flow increases the overall circulating flow decreases, the shortest flow has to be minimized. The inventors of the present invention, from various experimental results, have found that the area encircled by the center axis 50 of the rotational shaft and the outer edge of the flat impeller 29 should be more than 60%, preferably more than 80%, of the area enclosed by the center axis 50, the inner wall 51 of the container and the baffle plate 27.

Also, the power required for stirring in the present invention is similar to that for the conventional large paddle impellers, and belongs to the category of low power requirement as stirring impellers for highly viscous fluids. The heat transfer coefficients of the container walls are better in the present embodiment than the conventional stirring impellers for highly viscous materials because of the scraping effect of the large flat impeller and the exchange of fluid by the vertical circulating flow.

Furthermore, the structure of the present invention is as simple as the paddle and anchor impellers; it is simpler than the helical ribbon impeller of ten used for highly viscous fluids and the stirring impellers of the previous patent applications discussed above.

As discussed above, this embodiment of the present invention satisfies all the requirements listed above for a reaction apparatus for continuous polymerization reactions.

Also, although perforated plates are used as baffle plates in the above as an example, annular rings or any other types of structures and shapes may be used instead.

FIG. 14 is a vertical section of another embodiment of the reaction apparatus of the present invention, and FIG. 15 is a horizontal section along the IV—IV line in FIG. 14.

In this embodiment, two flat impellers 29(a), 29(b) are attached to the rotational shaft 25 at 180° apart from each other in a parallel fashion to the center axis 50 of the rotational shaft 25. Together with these flat impellers, four slanted impellers 30(a), 30(b), 30(c), 30(d), two in a high position and the other two in a low position, are attached to the rotational shaft 25 at 90° apart from the flat impellers. They are tilted with respect to the center axis 50 of the rotational shaft 25 at the same angle and in the same direction as shown in the figures.

As this embodiment indicates, there exist no restrictions as to the number of flat and slanted impellers for the reaction apparatus of the present invention. Also, partitioning means that are also a heat exchanger comprising tube sheets 40, a shell 41 and tubes 42 are disposed between stirring chambers so that the highly viscous fluid passing through the tubes 42 can be cooled or heated by heat conducting oil or the like outside the tubes and inside the shell. The tubes 42 act as baffle plates as well as a heat exchanger.

Figure 16:
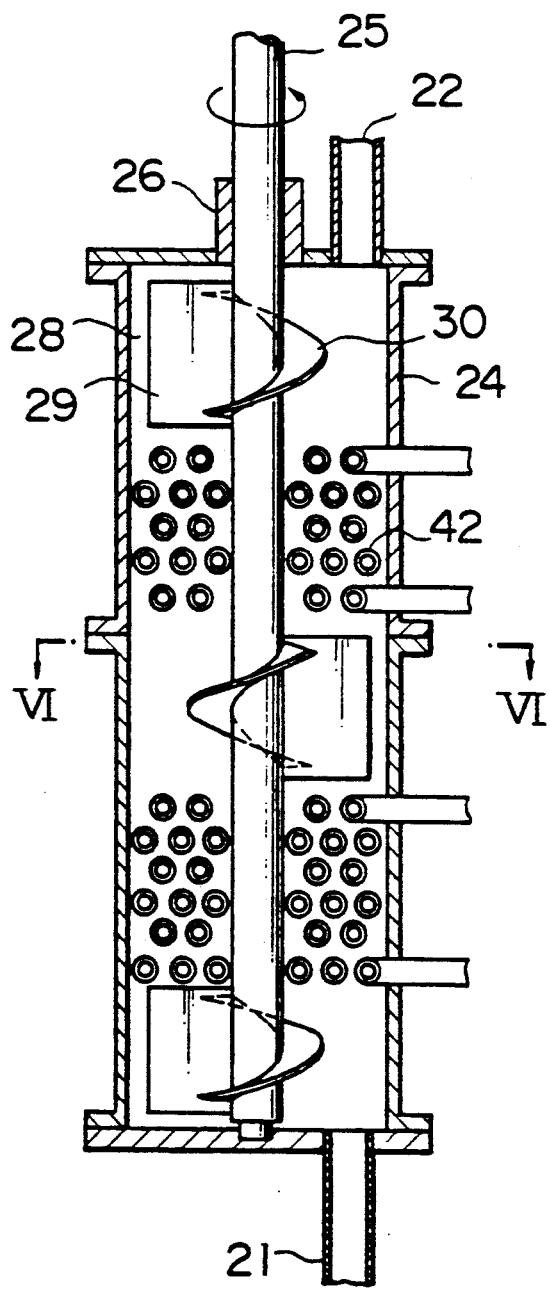
FIG. 16 is a vertical section of still another embodiment of the reaction apparatus of the present invention.
Figure 17:
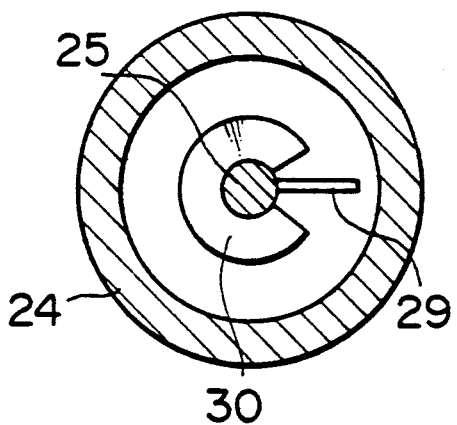
FIG. 17 is a horizontal section along the VI—VI line in FIG. 16.

FIG. 16 is a vertical section of still another embodiment of the reaction apparatus of the present invention, and FIG. 17 is a horizontal section along the VI—VI line in FIG. 16.

In this embodiment, stirring means comprise a combination of one flat impeller 29 and a spiral slanted impeller 30. This embodiment shows that the reaction apparatus of the present invention is by no means restricted to flat slanted impellers. Also, a coiled tube 42 in inserted into a partitioning means between stirring chambers 28 so that the highly viscous fluid passing through this part can be cooled or heated by letting heat conducting oil or the like flow in the tube. This coiled tube also acts as a partitioning means.

In the following, experimental results for the residence time distribution for reaction apparatuses of the present invention and of conventional types.

In this experiment, a test apparatus comprising a long cylindrical container of clear acrylic resin whose inner diameter is 200 mm was used, and this container was divided into 28 stirring chambers and 27 heat exchanging parts. The experiment was carried out for different stirring impellers attached to the test apparatus in turn.

The height of the stirring chamber was 100 mm, and four acrylic tubes whose inner diameter is 23 mm were disposed in the heat exchanging part whose height was also 100 mm. This combination is almost identical to the apparatus in FIG. 14.

Starch syrup of 200 poise was used and supplied from the bottom of the container using a gear pump. While the starch syrup was being supplied continuously, red ink was injected as a pulse and watched by the eye as it flowed, and the concentration at the outlet was continuously measured to find the residence time distribution.

TABLE 2 summarizes the observation of flow and the impeller used. In the table, the comparative examples are for the case of conventional reaction apparatuses, and the experimental examples are as described above.

TABLE 2

|  | Impellers used | Flow in stirring chamber |
| --- | --- | --- |
| Comparative Example B1 | Two large paddles | Almost no vertical flow insufficient flow areas in the center |
| Comparative Example B2 | Helical ribbon | Vertical flow observed insufficient flow areas between the ribbon impellers |
| Experimental Example B1 | FIGS. 12 and 13 | Vertical flow observed No insufficient flow areas |
| Experimental Example B2 | FIGS. 14 and 15 | Vertical flow observed No insufficient flow areas |
| Experimental Example B3 | FIGS. 16 and 17 | Vertical flow observed No insufficient flow areas |

From TABLE 2, the following becomes clear:

(1) There exist insufficient flow areas for large paddle and helical ribbon impellers which are conventional stirring methods.

(2) In Experimental Examples B1 to B3, in which the impeller configurations of the present invention were used, no insufficient flow areas were observed.

Figure 18:
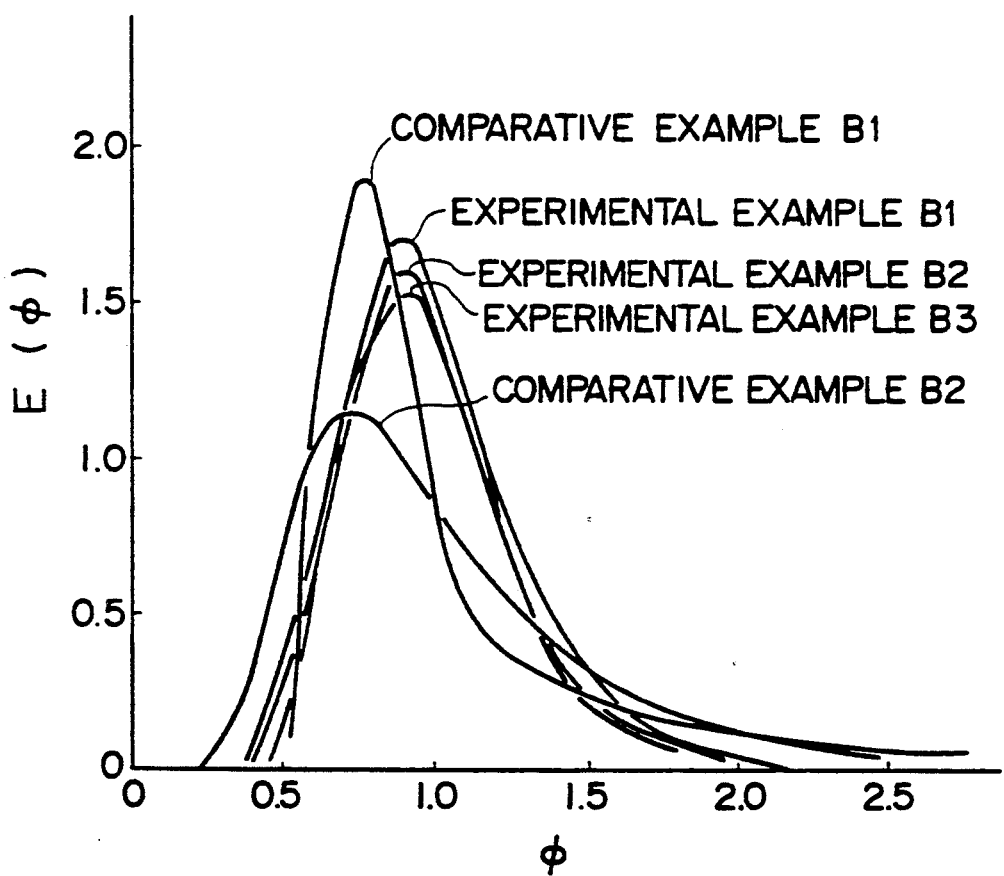
FIG. 18 shows experimental results obtained for the residence time distribution for Comparative Examples B1 and B2 and Experimental Examples B1 to B3 of the present invention.

FIG. 18 shows results obtained for the residence time distribution of starch syrup in the cylindrical container for Comparative Examples B1 and B2 and Experimental Examples B1 to B3. In FIG. 18, $E(\rho)$ on the ordinate is the residence time distribution as a function of the dimensionless time $\rho$, which is on the abscissa.

In the case of Comparative Example B1, the peak height and position are shifted considerably from the continuously stirred tank reactors model, and the amount of fluid staying for a long time is quite large, which is not a desirable situation.

In the case of Comparative Example B2, the peak height is low, and the corresponding number of chambers in the continuously stirred tank reactors model is also small indicating that the situation is away from the piston flow. The reason for this can be that part of the fluid tends to bypass toward the outlet because the vertical circulation flow is too strong.

The residence time distributions of Experimental Examples B1 to B3 are close to the continuously stirred tank reactors model and are indeed what is desired.

The reaction apparatus of the present invention shows the following desirable effects, and the present provides a stirring tower type apparatus for polymerization reactions which is useful industrially.

(1) The reaction apparatus of the present invention can achieve the piston flow characteristics and, together with special mixing effects, may control the temperature of each stirring area independently as a polymerization reaction progresses because partitioning means are disposed between the stirring areas. Also, tubes for heat exchange can be inserted into the partitioning means to make independent temperature control in the each stirring area still easier.

(2) Since, in the reaction apparatus of the present invention, two types of stirring impellers, slanted and flat, are attached to the rotational shaft, up, down, horizontal circulation flows are formed, and a high mixing efficiency is achieved for highly viscous liquid and slurry type materials without areas in which flow is obstructed.

(3) In conventional reaction apparatuses, gelled material often attaches to the rotational shaft because the flow around the shaft is not sufficient, while in the reaction apparatus of the present invention no attachment of gelled material occurs because of its high mixing performance.

(4) Since the reaction apparatus of the present invention has two types of impellers, slanted and flat, it requires less power to stir than the one with flat impellers only.

(5) The scraping effect of the flat impellers and the exchange of fluid due to the generation of vertical flow help to improve the heat transfer coefficients, resulting in superior heat conductance.

(6) The reaction apparatus has a simple structure.

While specific embodiments of the invention have been shown and described in detail to illustrate the application of the principles of the invention, it will be understood that the invention may be embodied otherwise without departing from such principles.

What is claimed is:

1. A stirring apparatus comprising: a container having inner walls; a rotational shaft inserted in said container substantially in the center of said container, said rotational shaft having a central rotational axis, said rotational shaft and the inner walls of said container defining a stirring space substantially fully filled with material to be stirred, said rotational shaft, lower and side inner walls of said container and a container upper end level cooperating to define a stirring cross-sectional area; a flat impeller connected to said rotational shaft extending substantially parallel to said rotational axis of said rotational shaft, said flat impeller having a continuous uninterrupted surface with a surface area which is more than 80 percent of said stirring cross-sectional area; and a slanted impeller connected to said rotational shaft at a slanting angle with respect to said center axis of said rotational shaft, said slanted impeller cooperating with said flat impeller to form impeller sets, including at least first impeller set and a second impeller set; and partitioning means disposed between said first impeller set and said second impeller set to divide said container in a longitudinal direction and to allow fluid to flow therethrough, said partitioning means including a plate including a shell connecting stirring spaces above said plate and below said plate.

2. A stirring apparatus as claimed in claim 1, wherein a plurality of said slanted impellers are attached to said rotational shaft.

3. A stirring tower apparatus for polymerization reactions comprising a cylindrical container having a fluid supply inlet and a fluid outlet, a rotational shaft coaxially inserted into said container, said rotational shaft having a central rotational axis, stirring means having a plurality of flat impellers, each flat impeller being attached to said rotational shaft and extending parallel to said rotational axis of said rotational shaft and including a plurality of slanted impellers attached to said rotational shaft tilted with respect to said rotational axis, said slanted impellers forming sets with corresponding said flat impellers, and partitioning means disposed between said stirring means to divide said container in the longitudinal direction and to allow fluid to flow therethrough, said rotational shaft and said cylindrical container defining a stirring space having a stirring cross-sectional area defined by an inner wall of said container, upper and lower elements of said partitioning means and said rotational shaft, each of said flat impellers having a flat surface area greater than 60% of said stirring cross-sectional area, said partitioning means includes a lower tube plate and an upper tube plate, tubes connecting stirring spaces above said upper tube plate and below said lower tube plate and a shell surrounding said tubes and connecting said upper and lower tube plates.

4. A stirring tower apparatus as claimed in claim 3, wherein said partitioning means comprise porous plates.

5. A stirring tower apparatus as claimed in claim 3, wherein said partitioning means comprise a coiled tube.

6. A stirring apparatus comprising; a container having inner walls, the inner walls having an upper end, said inner walls defining a material fill chamber; a rotational shaft extending through said container, said shaft being positioned substantially in the center of said container, said rotational shaft having a central rotational axis, said rotational shaft, said inner walls and a material fill level defined by a container upper end cooperating to define a stirring cross-sectional area; a flat impeller connected to said rotational shaft extending substantially parallel to said rotational axis of said rotational shaft, said flat impeller having a continuous uninterrupted surface with a surface area which is more than 80 percent of said stirring cross-sectional area; and, an inclined impeller being connected to said rotational shaft at an angle of inclination with respect to said center axis of said rotational shaft, said slanted impeller cooperating with said flat impeller to form impeller sets, including at least a first impeller set and a second impeller set; and partitioning means disposed between said a first impeller set and said second impeller set to divide said container in a longitudinal direction and to allow fluid to pass therethrough, said partitioning means including a plate including a shell connecting stirring spaces above said plate and below said plate.

7. A method for stirring a material, comprising the steps of: providing a container having inner walls; positioning a rotational shaft in said container, substantially in the center of said container and mounting said rotational shaft for rotation about a central rotational axis; providing a flat impeller connected to the rotational shaft such that it extends substantially parallel to the rotational shaft, the flat impeller being provided with a continuous uninterrupted surface, providing a stirring cross-sectional area defined by the rotational shaft, the lower and side inner walls of the container and a container upper end; providing that the continuous uninterrupted surface of the flat impeller is more than 80 percent of the stirring cross-sectional area; providing a slanted impeller connected to the rotational shaft at a slanting angle with respect to the center axis of the rotational shaft and filling said container to a material fill level such that said stirring cross-sectional area is completely filled with said material; providing sets of said flat impeller and said slanted impeller with a corresponding stirring cross-sectional area and providing a partition between adjacent sets and adjacent stirring cross-sectional areas and providing communication between adjacent cross-sectional areas through tubes connecting said adjacent stirring cross-sectional areas.

* * * * *